(12) United States Patent
Radivojevic

(10) Patent No.: US 10,578,751 B2
(45) Date of Patent: Mar. 3, 2020

(54) COLLIMATED RADIATION SOURCE AND SCINTILLATING FIBRE PLATE FOR MEDICAL IMAGING

(71) Applicant: Nokia Technologies Oy, Espoo (FI)

(72) Inventor: Zoran Radivojevic, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 163 days.

(21) Appl. No.: 15/544,563

(22) PCT Filed: Jan. 12, 2016

(86) PCT No.: PCT/FI2016/050008
§ 371 (c)(1),
(2) Date: Jul. 19, 2017

(87) PCT Pub. No.: WO2016/116664
PCT Pub. Date: Jul. 28, 2016

(65) Prior Publication Data
US 2018/0003829 A1    Jan. 4, 2018

(30) Foreign Application Priority Data
Jan. 21, 2015 (EP) ..................................... 15151900

(51) Int. Cl.
*G01T 1/20* (2006.01)

(52) U.S. Cl.
CPC .................................. *G01T 1/2002* (2013.01)

(58) Field of Classification Search
CPC ....... G01T 1/2002; G01T 1/20; G01T 1/2006; G01T 1/1642; G01T 1/1615; G01T 1/2985
See application file for complete search history.

(56) References Cited

U.S. PATENT DOCUMENTS

| 4,991,189 | A | * | 2/1991 | Boomgaarden | .......... | A61B 6/06 |
| | | | | | | 378/151 |
| 5,308,986 | A | | 5/1994 | Walker | | |
| 5,636,299 | A | | 6/1997 | Bueno et al. | | |

(Continued)

FOREIGN PATENT DOCUMENTS

| WO | WO-99/28764 A1 | 6/1999 |
| WO | WO 00/37967 | 6/2000 |
| WO | WO 2014/097546 A1 | 6/2014 |

OTHER PUBLICATIONS

Ito, Michihiro, et al., "CS1(Na) Scintillation Plate With High Spatial Resolution", IEEE Transactions On Nuclear Science, vol. NS-34, No. 1, Feb. 1, 1987, pp. 401-405.

*Primary Examiner* — David P Porta
*Assistant Examiner* — Fani Boosalis
(74) *Attorney, Agent, or Firm* — Harrington & Smith

(57) ABSTRACT

An apparatus including a scintillator arrangement including a plurality of optically isolated scintillators that extend lengthwise along a plurality of respective parallel axes and define respective scintillation channels, wherein each of the optically isolated scintillators extends lengthwise between an input interface and an output interface and is arranged to receive higher energy photons at the input interface, to convert high energy photons to lower energy photons, and to output lower energy photons from the output interface in a respective scintillation channel, wherein the optical isolation reduces transmission of lower energy photons between scintillation channels.

20 Claims, 3 Drawing Sheets

(56) References Cited

U.S. PATENT DOCUMENTS

| | | | |
|---|---|---|---|
| 5,835,561 A * | 11/1998 | Moorman | A61B 6/06 |
| | | | 378/98 |
| 6,271,510 B1 * | 8/2001 | Boxen | G01T 1/1644 |
| | | | 250/208.1 |
| 2004/0218713 A1 | 11/2004 | Hoffman | |

* cited by examiner

COLLIMATED RADIATION SOURCE AND SCINTILLATING FIBRE PLATE FOR MEDICAL IMAGING

TECHNOLOGICAL FIELD

Embodiments of the present invention relate to scintillators. In particular, they relate to scintillators for medical imaging.

BACKGROUND

Radiation such as, for example, x-rays after passing through a target may be converted to visible light by scintillators. The visible light may then be imaged using a camera.

The scintillation process generates the visible light isotropically. Therefore thin scintillators must be used if blur of the imaged target is to be avoided and high quality images obtained. However, the use of thin scintillators reduces the conversion efficiency of x-rays to visible light meaning that larger x-ray doses are required.

BRIEF SUMMARY

It would be desirable to achieve high quality images at lower radiation doses.

According to various, but not necessarily all, embodiments of the invention there is provided an apparatus comprising: a scintillator arrangement comprising:

a plurality of optically isolated scintillators that extend lengthwise along a plurality of respective parallel axes and define respective scintillation channels, wherein each of the optically isolated scintillators extends lengthwise between an input interface and an output interface and is arranged to receive higher energy photons at the input interface, to convert high energy photons to lower energy photons, and to output lower energy photons from the output interface in a respective scintillation channel, wherein the optical isolation reduces transmission of lower energy photons between scintillation channels.

Some or all of the following may also be features of the apparatus:

the optical isolation reduces transmission of the lower energy photons between optically isolated scintillators;

optical isolation of adjacent scintillators defines spatially resolved, independent scintillation channels, the optical isolation reducing cross-talk between the spatially resolved, independent scintillation channels;

the scintillator arrangement further comprises an amplifier arrangement configured to increase a ratio of a number of low energy photons output from the output interface to a number of high energy photons received at the input interface;

the amplifier arrangement is configured to output lower energy photons predominantly from the output interface by re-directing lower energy photons;

the amplifier arrangement provides the optical isolation of the optically isolated scintillators;

each optically isolated scintillator comprises a combination of a scintillator and a light guide;

the light guide comprises as a core and a clad, wherein the core provides a scintillator and the clad is configured to reflect lower energy photons;

the clad is in material that reflects light or a material with a lower electrical permittivity than the core;

each optically isolated scintillator is an optical fiber comprising scintillation material;

each optically isolated scintillator comprises at the input interface a reflector configured to reflect lower energy photons towards the output interface;

each optically isolated scintillator is elongate having a length and a width, the length being at least 100 times larger than the width;

the plurality of optically isolated scintillators are packed with a density of greater than 10,000 optically isolated scintillators per square centimeter.

According to various, but not necessarily all, embodiments of the invention there is provided a collimated radiation source comprising:

one or more radiation sources for producing high energy photons; and a collimated high energy photon guide comprising a plurality of parallel, elongate apertures through a shielding layer that absorbs high energy photons.

Some or all of the following may also be features of the collimated radiation source:

the parallel, elongate apertures are arranged in a regular array such that the spacing between adjacent ones of the plurality of parallel, elongate apertures is constant;

the plurality of parallel, elongate apertures are provided by micro-channels through the shielding layer;

the shielding layer has a thickness, in direction of the collimated photons, of at least 1 cm;

each of the plurality of parallel, elongate apertures has the same aperture dimensions, wherein a maximum aperture dimension of an aperture does not exceed 100 micrometers;

the shielding layer is part of a radiation shield that surrounds the one or more radiation sources and absorbs high energy photons;

the one or more radiation sources comprise a radioactive isotope for producing x-rays.

According to various, but not necessarily all, embodiments of the invention there is provided a system comprising:

a collimated radiation source configured to provide high energy photons along a plurality of parallel high energy photon paths; and a scintillator arrangement comprising a plurality of optically isolated scintillators arranged in parallel along parallel axes.

Some or all of the following may also be features of the system:

the plurality of optically isolated scintillators are configured to convert received high energy photons to lower energy photons concentrated along the parallel axes;

the system further comprising an alignment mechanism configured to align at least some of the parallel axes and at least some of the parallel high energy photon paths such that high energy photons enter the optically isolated scintillators along the parallel axes. the alignment mechanism is configured to align each of the plurality of parallel axes with a respective one of the parallel high energy photon paths;

the system further comprising a plurality of detectors configured to detect lower energy photons produced by the optically isolated scintillators;

the system further comprising an alignment mechanism configured to enable alignment of the parallel high energy photon paths, the parallel axes of the scintillator arrangement and detectors;

the alignment mechanism comprises a feedback mechanism configured to process an output from the detectors to control alignment of the parallel high energy photon paths, the parallel axes of the scintillator arrangement and the detectors;

the feedback mechanism is configured to optimize the sharpness of an image detected by the detectors.

the apparatus further comprising an imaging mechanism configured to enable relative movement of one or both of the collimated radiation source and the scintillator arrangement relative to a target;

the imaging mechanism is configured to move the collimated radiation source and the scintillator arrangement around the target so that the target is imaged from different orientations;

the imaging mechanism is configured to move at least the collimated radiation source in a rectilinear direction parallel to an imaging plane;

the system is configured for high resolution, low-dose medical imaging.

According to various, but not necessarily all, embodiments of the invention there is provided a medical imaging method comprising:

producing streams of high energy photons along a plurality of parallel high energy photon paths through a target;

aligning a plurality of optically independent scintillators with high energy photon paths, wherein the plurality of optically independent scintillators convert the high energy photons to lower energy photons constrained to parallel low energy photon paths; and detecting the lower energy photons along the parallel low energy photon paths to define an image of the target.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

Figure 1:
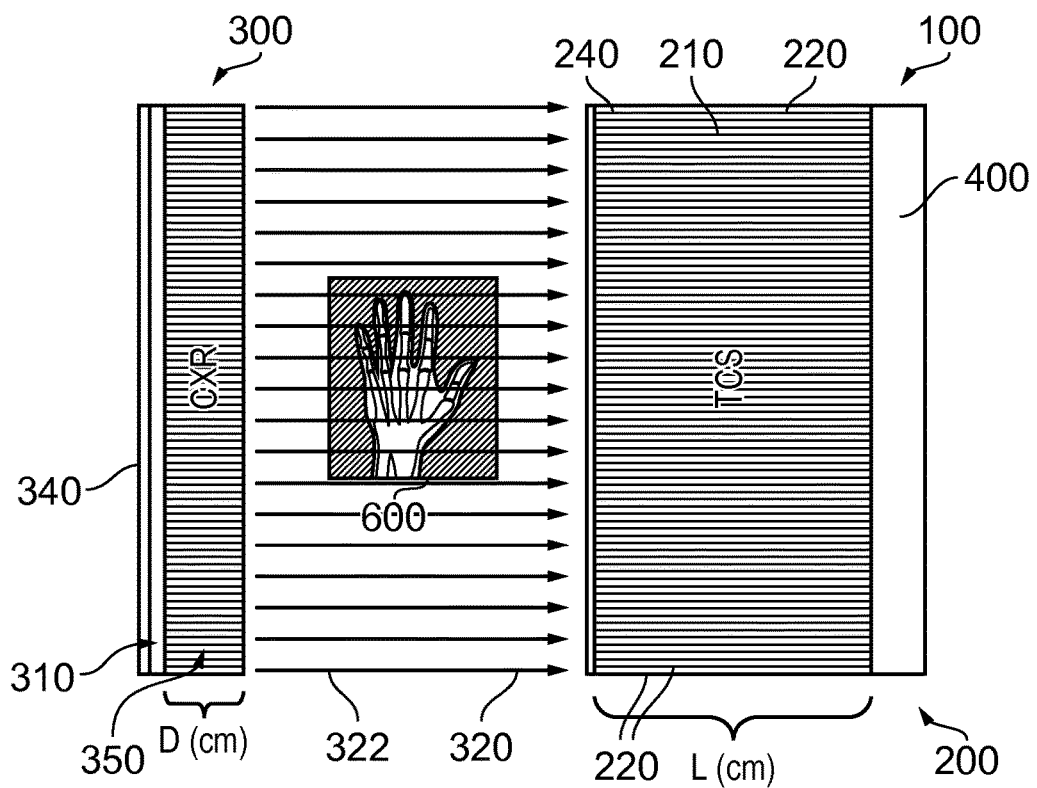
FIG. 1 illustrates an example of a system comprising a collimated radiation source and a scintillator arrangement.

FIG. 1 illustrates an example of a system 100 comprising a collimated radiation source 300 and a scintillator arrangement 210. The radiation source 300 provides high energy photons 322 to the scintillator arrangement 210. A target 600 is placed between the collimated radiation source at 300 and the scintillator arrangement 210. The high energy photons 322, whether or not they have passed through the target 600, are received at the scintillator arrangement 210. The scintillator arrangement 210 converts the received high energy photons 322 to lower energy photons which are detected by detectors. If the target 600 differentially absorbs the high energy photons 322, then the detectors 400 will differentially detect the lower energy photons 242.

The collimated radiation source 300 is configured to provide high energy photons 322 along a plurality of parallel high energy photon paths 320. The scintillator arrangement 210 comprises a plurality of optically isolated scintillators 220 arranged in parallel along parallel axes 240. The plurality of optically isolated scintillators 220 are configured to convert received high energy photons 322 to lower energy photons 242 concentrated along the parallel axis 240.

The collimated radiation source 300 comprises one or more radiation sources 310 for producing high energy photons 322 and a collimated high energy photon guide 320 that directs the produced high energy photons 322 along the plurality of parallel high energy photon paths 320.

Figure 2:
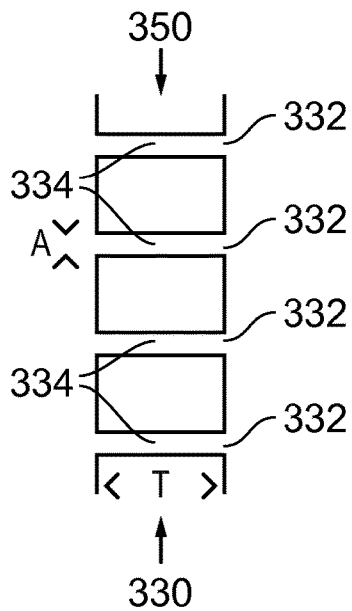
FIG. 2 illustrates an example of a collimated high energy photon guide for a radiation source.

FIG. 2 illustrates an example of a collimated high energy photon guide 350. This collimated high energy photon guide 350 comprises a plurality of parallel, elongate apertures 332 through a shielding layer 330 that absorbs high energy photons 322. The thickness T of the shielding layer 330 is large compared to the aperture dimensions A and the collimated high energy photon guide 350 therefore absorbs high energy photons 322 that are not parallel to the plurality of parallel high energy photon paths 320 aligned with the plurality of parallel, elongate apertures 332.

In the example illustrated, the plurality of parallel, elongate apertures 332 are formed by creating micro-channels 334 through the shielding layer 330. The shielding layer 330 may have a thickness T of several centimeters and the apertures 332 defined by the micro-channels 334 may have the same common aperture dimension A that does not exceed 100 micrometers. It will therefore be appreciated that the aspect ratio of the micro-channel 334 has a ratio of length T to width A of at least 100:1 and that the plurality of the parallel high energy photon paths 320 may not be exactly parallel, but are parallel within the tolerance defined by the aspect ratio.

In the example of FIG. 2, the parallel, elongate apertures 332 are arranged as a regular array having apertures 322 distributed both height-wise and widthwise. The array may be regular, in that the spacings between adjacent apertures 332 is constant throughout the array.

Figure 3:
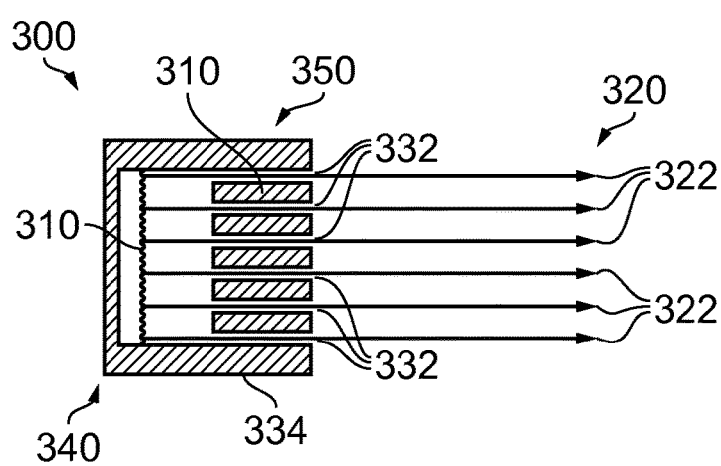
FIG. 3 illustrates an example of the collimated radiation source comprising a collimated high energy photon guide.

FIG. 3 illustrates an example of the collimated radiation source 300 in which the collimated high energy photon guide 350, illustrated in FIG. 2 is integrated within a shield 340. In this example the shielding layer 330 of the collimated high energy guide 350 is part of a radiation shield 340 that surrounds the one or more radiation sources 310. The shielding layer 330 and the radiation shield 340 may be formed from lead (or any heavier metal alloy or composite mixtures) and may be a single component or multiple components.

The one or more radiation sources 310 may, for example, produce x-rays. For example the radiation source 310 may be a radioactive foil and it may be, for example, formed from 241Am, 60Co, 137Cs, 252Cf, 152Eu, 90Sr or another radioisotope.

Figure 4:
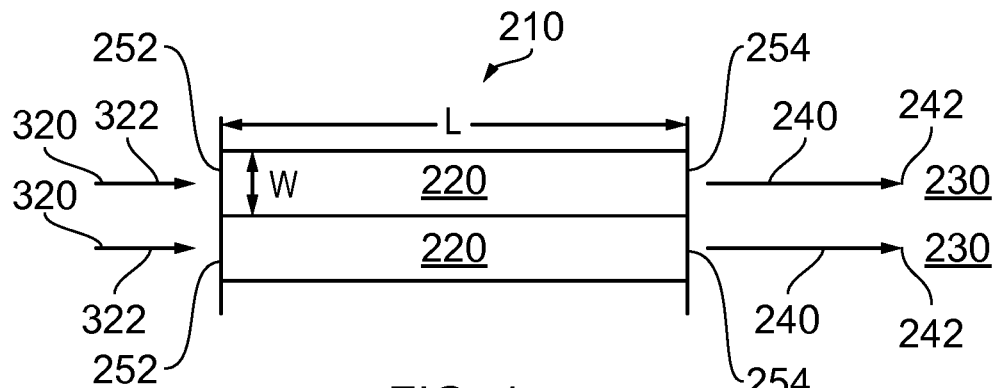
FIG. 4 illustrates an example of a scintillator arrangement comprising a plurality of optically isolated scintillators.

FIG. 4 illustrates an example of a scintillator arrangement 210 comprising a plurality of optically isolated scintillators 220. The plurality of optically isolated scintillators 220 extend lengthwise along a plurality of respective parallel axes 240 and define respective scintillation channels 230. Each optically isolated scintillator 220 extends lengthwise between an input interface 252 and an output interface 254 and is arranged to receive high energy photons 322 travelling along the high energy photon path 320 at the input interface 252, to convert high energy photons 322 to lower energy photons 242 and to output lower energy photons 242 from the output interface 254 in a respective scintillation channel 230.

The optical isolation of the optically isolated scintillators 220 reduces transmission of lower energy photons 242 between scintillation channels 230 by reducing transmission of lower energy photons 242 between the optically isolated scintillators 220. The optical isolation of adjacent optically isolated scintillators 220 defines spatially resolved, independent scintillation channels 230 and the optical isolation reduces cross-talk between the scintillation channels 230. This therefore improves the signal to noise ratio of the scintillation channels 230 meaning that a lower radiation dose (less high energy photons 322) needs to be applied to the target 600 as illustrated in FIG. 1.

The signal to noise ratio can be further improved by increasing the length L of the optically isolated scintillators 220 such that the probability of converting an incident high energy photon 322 to a lower energy photon 242 is significantly increased.

The absolute signal to noise detection efficiency and signal to noise ratio may be further increased, as described in more detail below, by redirecting lower energy photons 242 such that they preferentially exit the optically isolated scintillator 220 via the output interface 254. Significant improvements in absolute detection efficiency directly decrease the required patient irradiation dose.

Figure 5:
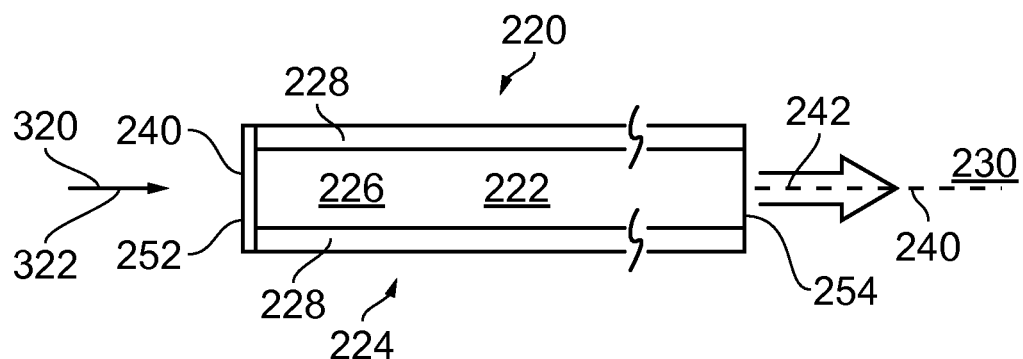
FIG. 5 illustrates an example of an optically isolated scintillator comprising a combination of a scintillator and a light guide.

The optical isolation reduces transmission of lower energy photons 242 between the optically isolated scintillators 220. FIG. 5 illustrates an example of an optically isolated scintillator 220 that comprises an amplifier arrangement designed to increase a signal to noise ratio of the scintillation channel 230 by increasing the optical gain. This is achieved by increasing the ratio of the number of lower energy photons 242 output by the output interface 254 divided by the number of high energy photons 322 received at the input interface 252 by redirecting lower energy photons 242. As a consequence, the optically isolated scintillator 220 outputs lower energy photons 242 predominantly from the output interface 254.

The amplifier arrangement in this example provides the optical isolation of the optically isolated scintillators 220 by redirecting the lower energy photons 242. An alternative to redirection of lower energy photons 242 to achieve optical isolation may be absorbing the lower energy photons 242.

In the example of FIG. 5, the optically isolated scintillator 220 comprises a combination of a scintillator 222 and a light guide 224. The light guide 224 comprises a core 226 and a clad 228. The core 226 is the scintillator 222 and the clad 228 reflects incident lower energy photons 242.

In some, but not necessarily all embodiments, the clad 228 may be formed from a reflective material that reflects the lower energy photons 242 irrespective of the angle of incidence.

In some, but not necessarily all embodiments, the clad 228 may be formed from a material with a lower electrical permittivity than the core 226. In this example, the reflection of light occurs by total internal reflection and is therefore dependent on the angle of incidence.

The scintillator 222 may be a optical fiber comprising scintillation material. Such optical fibers may be, for example, formed by a micro-pulling down technique. This method can produce fibers made of glass scintillator, polymer-plastic scintillator or another crystal type scintillators. A small seed crystal is contacted with the melt, including scintillating material, formed in a crucible. Examples of scintillating materials include, but are not limited to, thallium doped cesium iodide and gadolinium oxysulfide. The seed crystal is then pulled downward at a constant rate to produce an elongate fiber-shaped single crystal. The pulling rate in the case of glass is about 0.5 mm per minute and it may be pulled to lengths of greater than 1 meter. The produced fibers can then be used as scintillators 222 and they may be custom clad to create optically isolated scintillators 220. They may then be bundled to create the scintillator arrangement 210.

Another methods for realizing the fiber-shaped elongated single crystal scintillators may exploit CVD (Chemical vapor deposition) or a DVD (Direct Vapor Deposition) techniques depending on the total length of the fibers required. In typical CVD, the substrate is exposed to one or more volatile precursors, which react and/or decompose on the substrate surface to produce the desired deposit.

The DVD is an advanced approach for vapor depositing high quality materials. This process is capable of depositing structurally controlled crystalline or porous multi-layers of complex components. The DVD precisely controls the transport of vapor atoms from the source to a substrate. To achieve this, DVD might utilizes a trans-sonic gas jet to direct a thermally evaporated vapor cloud onto a substrate. The DVD approach directs the evaporants onto a substrate allowing high deposition rates and less material waste.

Referring back to FIG. 5, each optically isolated scintillator 220 comprises, at the input interface 252, a reflector 240 configured to reflect lower energy photons 242 towards the output interface 254. The reflector 240 is also configured to enable the high energy photons 322 to enter the optically isolated scintillator 220 via the input interface 252. The reflector 240 increases the optical gain of the optically isolated scintillator 220 and it should be appreciated that such a reflector 240 may be used on any optically isolated scintillator 220 and its use is not confined to the particular optically isolated scintillator 220 illustrated in FIG. 5.

The optically isolated scintillator 220, as illustrated in FIGS. 1, 4 and 5, is elongate. Referring to FIG. 4, the length of the optically isolated scintillator 220 is indicated by L and its width is indicated by W. An optically isolated scintillator 220 may have a length to width ratio that is greater than 100. For example, the length L may be greater than 10 mm and its width may be of the order of 10's of micrometers such as for example 20 micrometers. When such optically isolated scintillators 220 are bundled to form a scintillator arrangement 210, if the optically isolated scintillators 220 have a width of 20 micrometers then they may be packed with a resolution significantly greater than 100 pixels per centimeter. It will therefore be appreciated that the packing density of the bundled optically isolated scintillators 220 may well be significantly in excess of 10,000 optically isolated scintillators 220 per square centimeter. It will therefore be appreciative that scintillator arrangement 210 is capable of producing high resolution imaging.

The parallel axis 240 may be curved or rectilinear. Where they are rectilinear, the input interface 252 receives high energy photons 322 from a first direction along respective parallel axis 240. The corresponding output interface 254 outputs lower energy photons 242 predominantly in the first direction along the respective parallel axes 240.

Figure 6:
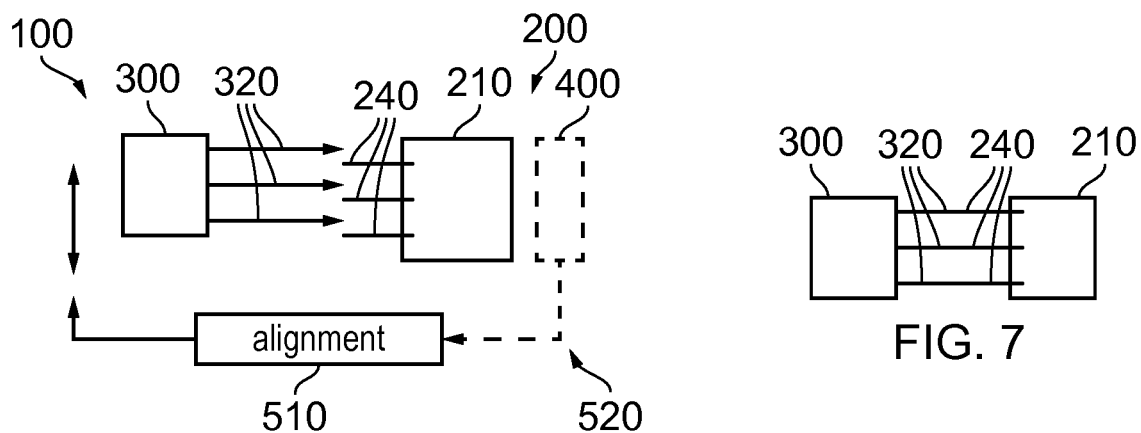
FIG. 6 illustrates an example of the system comprising an alignment mechanism and feedback mechanism.

FIG. 6 illustrates an example of the system 100 illustrated in FIG. 1. The system comprises a collimated radiation source 300 and a scintillator arrangement 210. In use, detectors 400 will also be present. In some examples, the detectors 400 are integrated with the scintillator arrangement 210 and in other examples the detectors 400 are provided separately to the scintillator arrangement 210.

Figure 7:
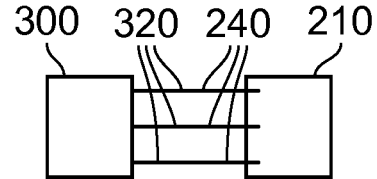
FIG. 7 illustrates an example of the system after alignment.

In this example, the system 100 comprises an alignment mechanism 510 configured to align parallel axes 240 and parallel high energy photon paths 320 such that high energy photons 322 enter an optically isolated scintillator 220 along a parallel axis 240. FIG. 6 illustrates the situation when there is mis-alignment and FIG. 7 illustrates the situation when alignment has been achieved.

The alignment mechanism 510 may enable the movement one or both of the collimated radiation source 300 and the scintillator arrangement 210 in orthogonal directions (x, y) within a plane that is normal (perpendicular) to a virtual line (z) that runs between the collimated radiation source 300 and the scintillator arrangement 210 via the target 600. Such mechanism exist, for example, for aligning microscope stages with a microscope lens. The alignment mechanism 510 may be controlled manually or automatically by for example a computer or controller.

The alignment mechanism 510 may be configured to align one of the plurality parallel axis 240 and a respective one of the plurality parallel high energy photon paths 320.

A feedback mechanism 520 may be configured to process output from the detectors 400 to control the alignment mechanism of 510. For example, the feedback mechanism 520 may optimize the sharpness of an image detected the detectors 400. That is, the scintillator arrangement 210 and the collimated radiation source 300 are moved relative to each other until minimum blur and maximum sharpness are obtained. The algorithms used for auto-focusing a digital camera may, for example, be used to control the alignment mechanism 510.

The detectors 400 are configured to detect low energy photons 242 produced by the optically isolated scintillators 220. The detectors 400 may, for example, be photo diodes, photo transistors other forms of photon detectors such as a charge couple device (CCD) image sensor or a complimentary metal oxide semiconductor (CMOS) image sensor.

The detectors 400 may be configured to detect visible light and/or infrared light if the low energy photons 242 are in this wavelength range.

Figure 8:
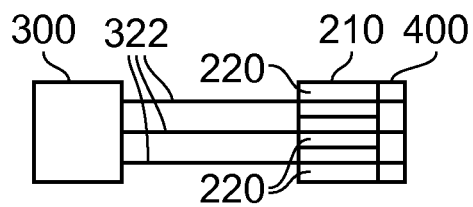
FIG. 8 illustrates an example of the system after alignment, where the detectors are integrated to the scintillator arrangement.

FIG. 8 illustrates an example where the detectors 400 are integrated to the scintillator arrangement 210. In this example each detector 400 is aligned with a parallel axis 240 such that a detector 400 detects an output from only the aligned optically isolated scintillator 220. Each detector therefore detects a single scintillation channel 230. In this situation the alignment of the detectors 400 and the scintillator arrangement 210 is guaranteed.

Where the detectors 400 are supplied separately to the scintillator arrangement 210, there may be a calibration process required to align not only the scintillator arrangement 210 and the collimated radiation source 300 but to align the scintillator arrangement 210, the collimated radiation source 300 and the detectors 400. The calibration process may be automated.

Figure 9:
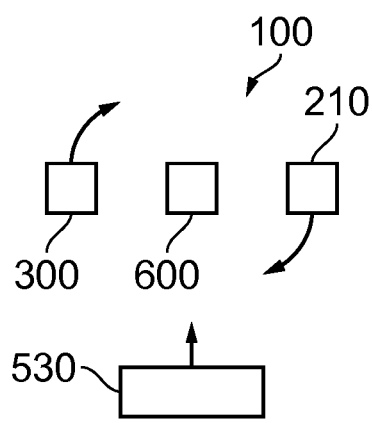
FIGS. 9 and 10 illustrate different examples of a system comprising an imaging mechanism configured to enable movement of one or both of the collimated radiation source and the scintillator arrangement relative to the target.
Figure 10:
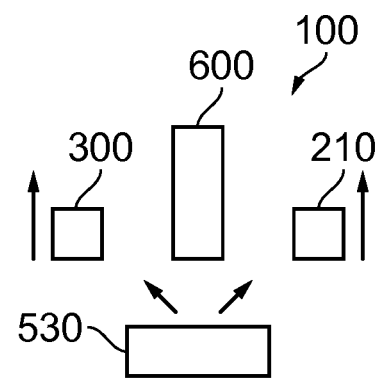

FIGS. 9 and 10 illustrate different examples of a system 100 as previously described additionally comprising an imaging mechanism 530 configured to enable relative movement of one or both of the collimated radiation source 300 and the scintillator arrangement 210 relative to the target 600.

In the example of FIG. 9, both the collimated radiation source 300 and the scintillator arrangement 210 are moved around the target 600 so that the target 600 is imaged from different orientations. The collimated radiation source 300 and the scintillator arrangement 210 are moved such that the target 600 remains between them.

In the example of FIG. 10, the imaging mechanism 530 moves the collimated radiation source 300 and/or the scintillator arrangement 210 relative to the target 600. In the example illustrated both the scintillator arrangement 210 and the collimated radiation source 300 are moved in parallel.

Figure 11:
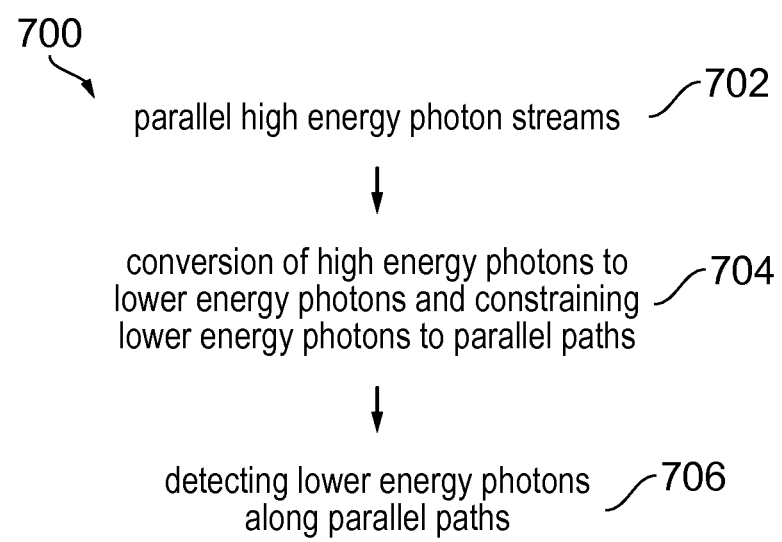
FIG. 11 illustrates an example of a method.

FIG. 11 illustrates a method 700 comprising producing parallel high energy photon streams (block 702), converting high energy photons 322 to lower energy photons 242 and constraining the lower energy photons 242 to parallel paths (block 704), and detecting lower energy photons along the parallel paths (block 706).

From the foregoing description it will be appreciated that the system 100 has particular application, but is not limited to, medical imaging. Medical imaging refers to the imaging of a target which is a living animal or person. In such circumstances it may be desirable to reduce, minimize or control the radiation dose received by the target 600. The embodiments of the invention described above provide a system 100 with increased signal to noise ratio, this facilitates the use of lower radiation doses at the target 600.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a scintillator arrangement having a bundled plurality of scintillator fibers extending lengthwise along a plurality of respective parallel axes and defining respective scintillation channels, each of the scintillator fibers extending lengthwise between an input interface and an output interface and being arranged to receive high-energy photons at the input interface, to convert the high-energy photons to photons of lower energy than the high-energy photons, and to output the photons of lower energy from the output interface in a respective scintillation channel, wherein each scintillator fiber in said bundled plurality of scintillator fibers is optically isolated from other scintillator fibers in said bundled plurality to reduce transmission of the photons of lower energy between scintillation channels; and
   a plurality of photon detectors at an output-interface end of the bundled plurality of scintillator fibers, said photon detectors being selected from the group consisting of charge-coupled device (CCD) image sensors and complementary metal-oxide-semiconductor (CMOS) image sensors,
   wherein the bundled plurality of scintillator fibers is bundled with a density of greater than ten thousand scintillator fibers per square centimeter.

2. The apparatus as claimed in claim 1, wherein optical isolation of adjacent scintillator fibers makes the scintillation channels spatially resolved and independent from one another, and reduces crosstalk between the spatially resolved, independent scintillation channels.

3. The apparatus as claimed in claim 1, wherein the scintillator arrangement further comprises an amplifier arrangement configured to increase a ratio of a number of photons of lower energy output from the output interface to a number of high-energy photons received at the input interface.

4. The apparatus as claimed in claim 3, wherein the amplifier arrangement is configured to output photons of lower energy predominantly from the output interface by re-directing the photons of lower energy and/or wherein the amplifier arrangement provides the optical isolation of the scintillator fibers.

5. The apparatus as claimed in claim 1, wherein each scintillator fiber comprises a light guide wherein the light guide has a core and a clad, and wherein the core provides a scintillator and the clad is configured to reflect the photons of lower energy within the scintillator.

6. The apparatus as claimed in claim 5, wherein the clad is of a reflective material or is of a material with a lower electrical permittivity than the core.

7. The apparatus as claimed in claim 1, wherein each scintillator fiber is an optical fiber comprising scintillation material.

8. The apparatus as claimed in claim 1, wherein the input interface of each scintillator fiber comprises a reflector to reflect the photons of lower energy towards the output interface.

9. The apparatus as claimed in claim 1, wherein each scintillator fiber is elongated having a length and a width, the length being at least one hundred times larger than the width.

10. The apparatus as claimed in claim 1, further comprising:
    one or more radiation sources for producing high-energy photons; and
    a collimated high-energy photon guide comprising a plurality of parallel, elongated apertures through a shielding layer absorbing high-energy photons.

11. The apparatus as claimed in claim 10, further comprising an alignment mechanism configured to align at least some of the parallel axes and at least some of the parallel elongated apertures such that high-energy photons enter the scintillator fibers along the parallel axes.

12. The apparatus as claimed in claim 11, wherein the alignment mechanism comprises a feedback mechanism configured to process an output from the photon detectors to control alignment of the parallel high-energy photons, the parallel axes of the scintillator arrangement, and the photon detectors.

13. An apparatus comprising:
    a scintillator arrangement having a bundled plurality of scintillator fibers extending lengthwise along a plurality of respective parallel axes and defining respective scintillation channels, each of the scintillator fibers extending lengthwise between an input interface and an output interface and being arranged to receive high-energy photons at the input interface, to convert the high-energy photons to photons of lower energy than the high-energy photons, and to output the photons of lower energy from the output interface in a respective scintillation channel, wherein each scintillator fiber in said bundled plurality of scintillator fibers is optically isolated from other scintillator fibers in said bundled plurality to reduce transmission of the photons of lower energy between scintillation channels;
    a plurality of photon detectors at an output-interface end of the bundled plurality of scintillator fibers, said photon detectors being selected from the group consisting of charge-coupled device (CCD) image sensors and complementary metal-oxide-semiconductor (CMOS) image sensors;
    one or more radiation sources for producing high-energy photons;
    a collimated high-energy photon guide comprising a plurality of parallel, elongated apertures through a shielding layer absorbing high-energy photons; and
    an alignment mechanism configured to align at least some of the parallel axes and at least some of the parallel elongated apertures such that high-energy photons enter the scintillator fibers along the parallel axes,
    wherein the alignment mechanism comprises a feedback mechanism configured to process an output from the photon detectors to control alignment of the parallel high-energy photons, the parallel axes of the scintillator arrangement, and the photon detectors.

14. The apparatus as claimed in claim 13, wherein optical isolation of adjacent scintillator fibers makes the scintillation channels spatially resolved and independent from one another, and reduces crosstalk between the spatially resolved, independent scintillation channels.

15. The apparatus as claimed in claim 13, wherein the scintillator arrangement further comprises an amplifier arrangement configured to increase a ratio of a number of photons of lower energy output from the output interface to a number of high-energy photons received at the input interface.

16. The apparatus as claimed in claim 15, wherein the amplifier arrangement is configured to output photons of lower energy predominantly from the output interface by re-directing the photons of lower energy and/or wherein the amplifier arrangement provides the optical isolation of the scintillator fibers.

17. The apparatus as claimed in claim 13, wherein each scintillator fiber comprises a light guide wherein the light guide has a core and a clad, wherein the core provides a scintillator and the clad is configured to reflect the photons of lower energy within the scintillator, and wherein the clad is of a reflective material or is of a material with a lower electrical permittivity than the core.

18. The apparatus as claimed in claim 13, wherein each scintillator fiber is an optical fiber comprising scintillation material.

19. The apparatus as claimed in claim 13, wherein the input interface of each scintillator fiber comprises a reflector to reflect the photons of lower energy towards the output interface.

20. The apparatus as claimed in claim 13, wherein each scintillator fiber is elongated having a length and a width, the length being at least one hundred times larger than the width.

\* \* \* \* \*